United States Patent [19]
Bendall

[11] 4,078,442
[45] * Mar. 14, 1978

[54] VARIABLE SPEED DRIVE

[76] Inventor: Wilfrid H. Bendall, Elmwood St., Old Saybrook, Conn. 06475

[*] Notice: The portion of the term of this patent subsequent to Feb. 1, 1994, has been disclaimed.

[21] Appl. No.: 714,192

[22] Filed: Aug. 13, 1976

Related U.S. Application Data

[63] Continuation-in-part of Ser. No. 650,167, Jan. 19, 1976, Pat. No. 4,005,609.

[51] Int. Cl.² .............................................. F16H 55/52
[52] U.S. Cl. .............................. 74/230.17 A; 74/229; 74/230.17 S
[58] Field of Search ........ 74/230.17 S, 229, 230.17 A, 74/230.17 C

[56] References Cited

U.S. PATENT DOCUMENTS

| 765,819 | 7/1904 | Cutter | 74/230.17 S |
| 803,810 | 11/1905 | Cutter | 74/230.17 S |
| 803,811 | 11/1905 | Cutter | 74/230.17 S |
| 3,718,405 | 2/1973 | Keiter et al. | 74/230.17 A |
| 3,807,248 | 4/1974 | Hooper | 74/230.17 A |
| 3,869,932 | 3/1975 | Fletcher | 74/230.17 C |

*Primary Examiner*—Benjamin W. Wyche

[57] ABSTRACT

The drive has axially opposed pairs of conical discs on parallel driving and driven shafts interconnected by a chain having traction members on the ends of the chain joint pins. The traction members are shaped to collect and wedge a high pressure lubricating film at the disc contacts. The driving shaft has lever control means for moving the discs axially to vary the drive speed ratio and the driven shaft has spring members maintaining chain tension. The driven shaft includes means limiting initial contact with the discs to permit graduated chain engagement and the chain link members have a rocking bearing contact with the pins.

7 Claims, 7 Drawing Figures

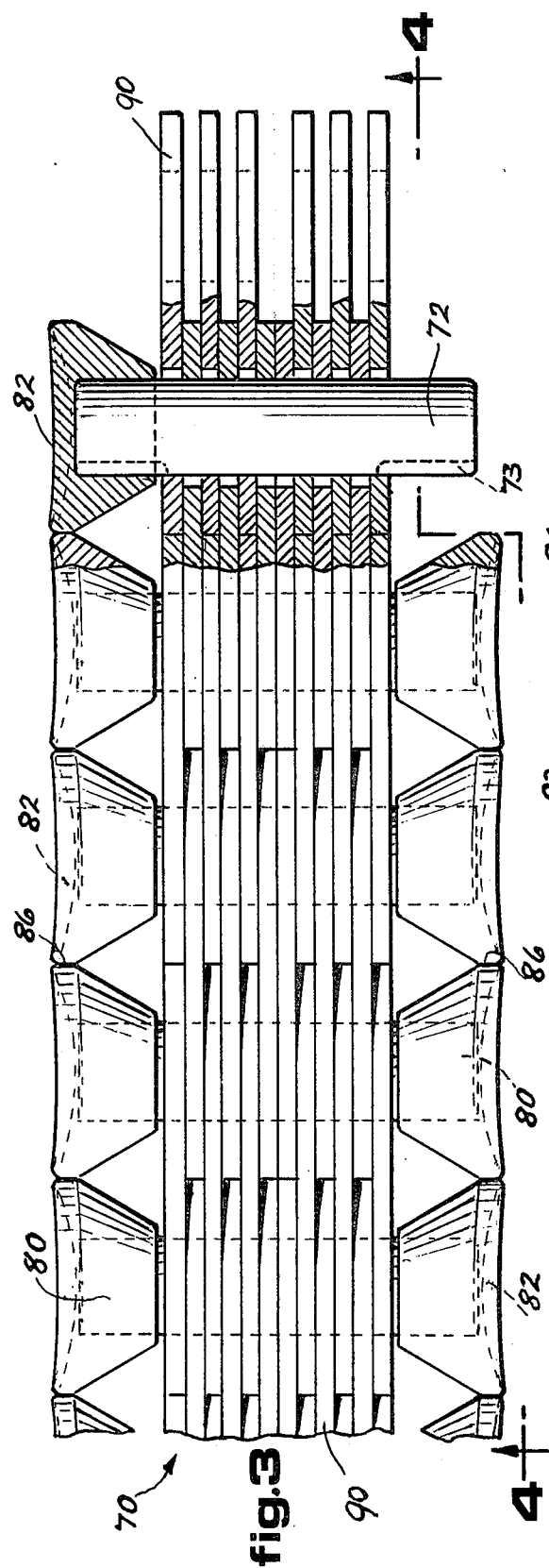
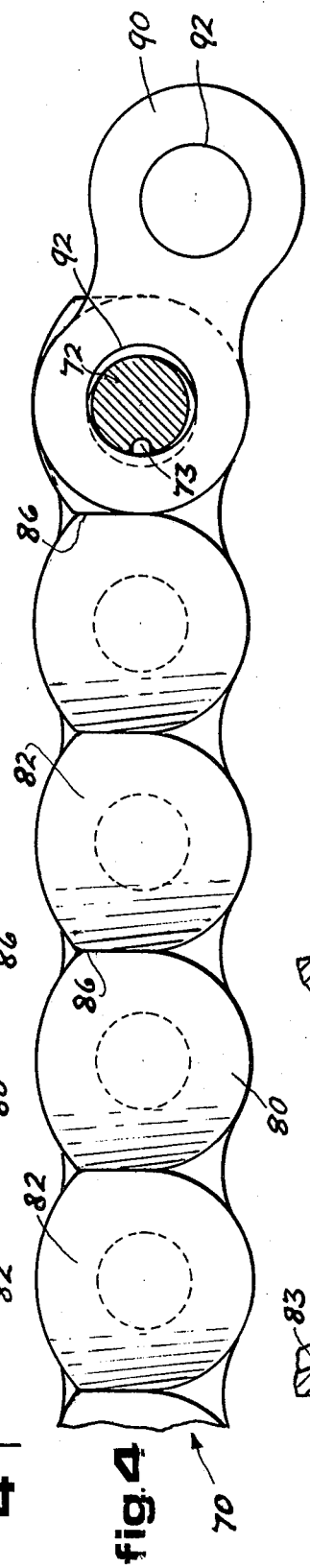
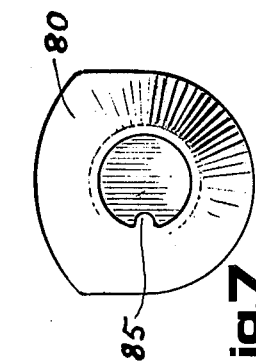
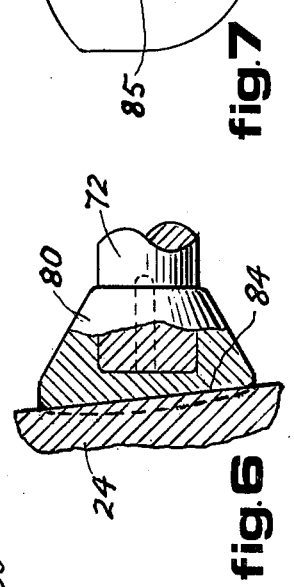
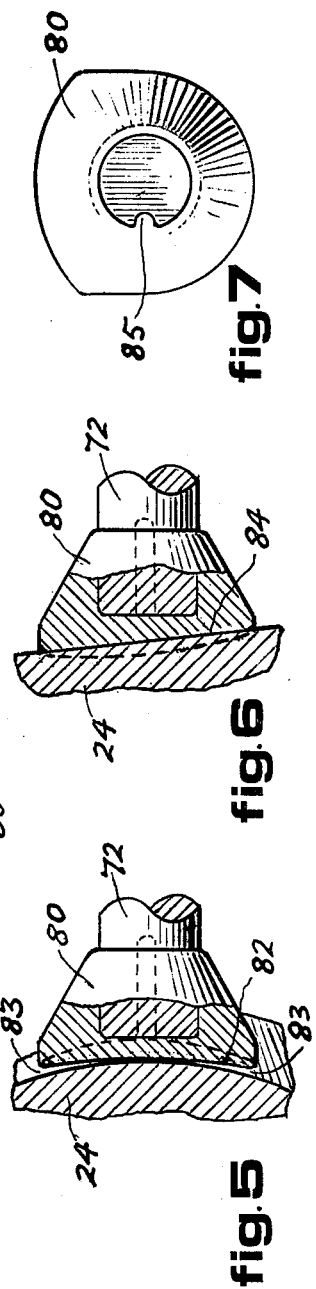

VARIABLE SPEED DRIVE

SUMMARY OF THE INVENTION

This is a continuation-in-part application of my prior copending application Ser. No. 650,167 filed Jan. 19, 1976 and allowed July 12, 1976 now U.S. Pat. No. 4,005,609.

The present invention relates generally to variable speed drives for mechanical power transmission using opposed pairs of conical discs on parallel input and output shafts interconnected by a link chain. Drives of this type are well known in the art, but as practiced industrially they are relatively heavy and expensive and have little or no application for mobile and industrial units requiring high specific output.

The principal performance limiting component in the chain. For durable, quiet operation over a wide linear speed range chains for this purpose involve the conflicting requirements of relatively high working tension with small link pitches and low specific weight. These conditions conflict further with the requirement for high traction with plain conical disc surfaces involving high normal pressures. Since link chains under tension comprise a relativey rigid, inelastic structure, they have limited ability to accommodate traction slip and drive shocks without destructive galling of the contacts. For the present purpose the traction contact needs to be capable of generating load-bearing lubricating films of substantial area and high traction coefficient. This is virtually impossible of attainment with currently used chain pin and traction surfaces having essentially "point" contact with the discs. Such traction means are subject to rapid wear resulting in slack in the chain which further accelerates wear and necessitates continuous axial adjustment of the drive discs to maintain chain tension.

Chain linkage for this purpose also presents special problems. As is generally known, link chains with the usual close clearance bushedpin joints are subject to failure at specific limiting speeds and loads for each pitch size of the chain owing to the difficulty of maintaining lubricant in the joints. Traction chains with split pin joints operating with a rocking bearing contact, more recently used for this purpose, reduce the lubricating problem but also limit effective traction with the drive discs since pin rotation imposes a twisting motion on the traction contact. Link articulation independently of the joint pins and traction contact is desirable.

It may therefore be inferred from the foregoing remarks that a primary object of the present invention is to provide chain driven variable speed transmissions of high capacity, embodying more durable and efficient traction means than heretofore achieved.

A further important object is to provide variable speed transmission chain means adapted to generate a load-bearing and lubricating traction film of substantial area at the engagement contact between the chain and drive discs.

Another important object is to provide variable speed transmission chain link interconnection means adapted to operate with a relatively frictionless rocking bearing independently of the traction contact.

Another object is to provide variable speed transmission chain traction means inherently able to accommodate drive slip and shocks without damage to the traction surfaces.

These and other objects and advantages of the present invention will be ascertainable to those knowledgeable in the art following reference to the accompanying description, drawings and claims of this specification.

THE DRAWINGS

FIG. 3 is a partly sectioned plan view of a portion of the traction chain of this invention.

FIG. 4 is a side elevational view of the chain taken on the line 4—4 of FIG. 3.

FIG. 5 is a fragmentary partly sectioned plan view of a chain traction member engaging a drive disc.

FIG. 6 is a fragmentary partly sectioned side elevational view of the traction member engagement with a drive disc.

FIG. 7 is an end view of the back, or pin recess side, of a chain traction member.

DETAILED DESCRIPTION

Figure 1:
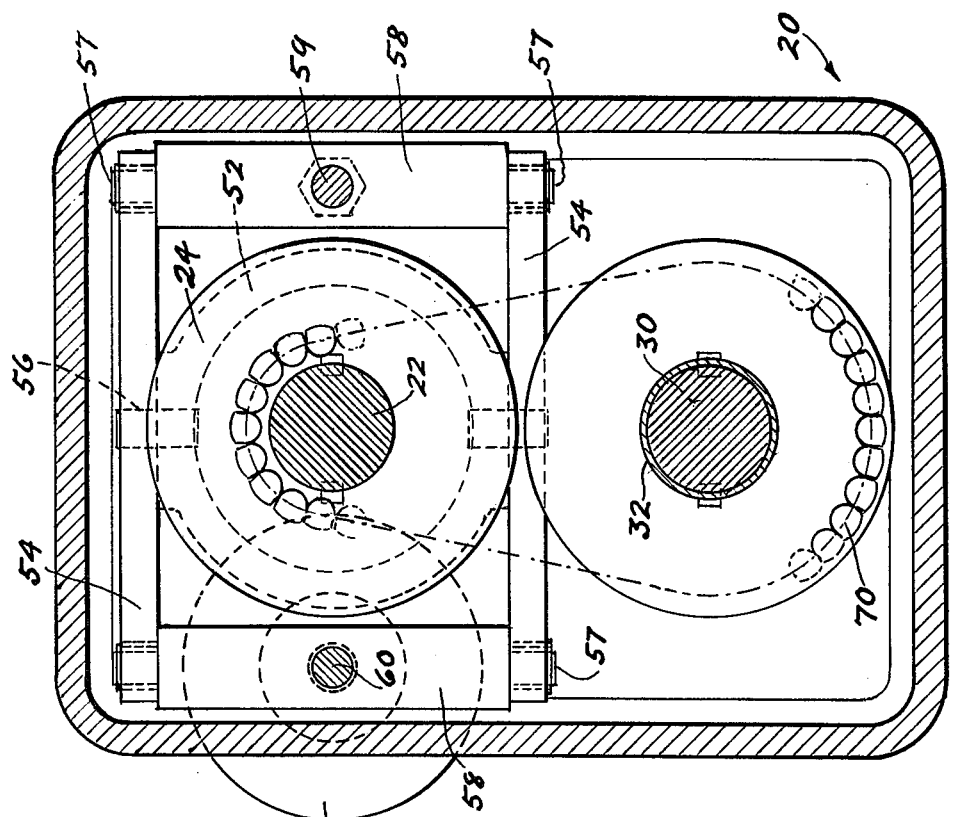
FIG. 1 is a partly sectioned, partly diagrammatic, internal view of the variable speed drive embodying the present invention.
Figure 2:
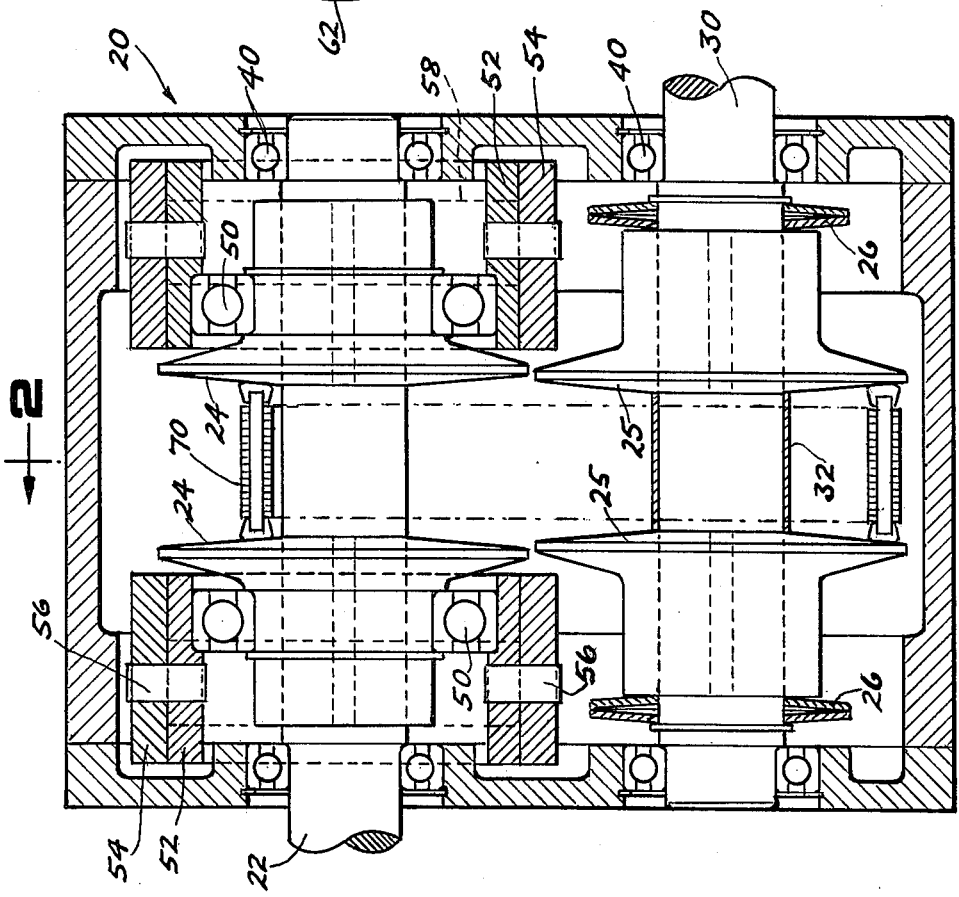
FIG. 2 is a similarly sectioned, partly diagrammatic transverse view on the line 2—2 of FIG. 1.

In FIGS. 1 and 2 numeral 20 designates a variable speed drive of this invention comprising a housing containing a lubricating medium and having opposed pairs of axially adjustable conical drive discs on parallel driving and driven shafts interconnected by a traction chain. Numeral 22 designates the driving, or input, shaft and numeral 30 the driven, or output shaft, both being mounted in bearings 40 in the housing. Driving discs 24 are keyed to shaft 22 and have disc axial adjustment thrust bearings 50 mounted on their hub portions, the thrust bearings in turn being mounted in ring members 52 pivoted on diametrically spaced control levers 54 having pivot centers 56. Control levers 54 are separately pivoted and held in fixed relationship at each end by lever spacing bars 58 having pivot centers 57. The spacing bars are secured for pivoting at one end by bolt or tie-rod means 59 and at their opposite end by a control screw 60 operated by control wheel 62. Rotation of the control wheel thus moves the driving discs axially towards or away from each other as required to provide the desired variable drive disc pitch diameter.

Variable pitch diameter driven discs 25 are keyed to output shaft 30 and are provided with disc springs 26 which maintain traction pressure and thus the chain tension in response to the driving disc pitch diameter changes effected as described by the control wheel. The closest inward axial approach of the driven discs may be limited by shaft sleeve member 32 interposed between the discs for a purpose described hereinafter.

The driving and driven disc pairs thus described are interconnected by the chain 70. As shown in FIGS. 3 and 4 the chain is provided with traction members 80 mounted on transverse chain pins 72 for wedged driving engagement between the conical discs. Co-aligned traction members at opposite ends of each chain pin have oppositely inclined internally conical working faces 82 with a mean conical radius slightly greater than the maximum drive disc radius they are required to engage. Shaped thus the traction members have an internally tangential working contact with the discs providing a substantially larger traction area than possible with the comparative point contacts of the prior art and are thus able to accommodate slip and drive shocks without damage to the traction surfaces. As illustratively detailed in FIG. 5 and 6 the coacting traction surfaces comprise converging contact areas, as at 83, adapted to collect and wedge a tangential load-bearing and lubricating traction film as they engage, each articulating section of the chain and traction members rotating into engagement with the discs with an essentially rolling action.

Traction members 80 may conveniently be fabricated by the sintered metal process and may be formed as shown in FIG. 7 with integral key portions 85 for engaging co-aligned keyways 73 in the chain pins. This ensures exact alignment of opposed pairs of traction members. Adjacent traction members are maintained in longitudinal alignment by coacting edge portions 86 which serve the additional purpose of limiting chain back-bend and dampening vibration.

As remarked earlier, chain linkage means capable of operation without rapid wear of the joints and traction surfaces is a critical requirement of chain driven variable speed drives. Substantial reduction of this basic difficulty is effected in the present invention by providing chain link members 90 with pin bearing apertures 92 sufficiently larger than the pin diameter to enable the links to articulate with a rocking bearing action on the pins. The link action thus effected also is independent of the traction contact, as is desirable. It may appear that this arrangement reduces the chain transverse bearing capacity for a given total chain width as compared with chains having separate link bearing members extending continuously across the chain width. It can be noted, however, that contact stress with the "cylinder on cylinder" bearing condition of paired rocker-joint pins is approximately three times greater than with the "cylinder in groove" pin bearing condition of the chain of the present invention. The reduced bearing linear dimension is thus more than compensated by the considerably lower stress and permissably larger relative pin diameter. The resulting link bearing more open to lubrication is a further advantage.

As noted earlier, the opposed spring loaded driven discs 25 on output shaft 30 may be limited in their closest axial approach by the sleeve member 32 extending between them, as shown in FIGS. 1 and 2. This permits the chain to function initially as a clutch and effect graduated engagement of the driven discs as axial adjustment of the drive discs increases chain tension.

Those knowledgeable in the art will be aware that the variable speed drive of this invention and its component parts may be duplicated in parallel to obtain units of increased power transmission capacity and that such arrangements and modifications of the control means, traction members and chain linkage, come within the scope of the appended claims.

What is claimed is:

1. A variable speed drive comprising a housing containing a lubricating medium and opposed pairs of axially adjustable conical drive discs on parallel driving and driven shafts interconnected by a pin-jointed traction chain, said chain having traction members on extended pin end portions for engaging the discs and being in transversely compressed traction contact therebetween, said traction members having an internally conical working face adapted to collect and wedge the lubricating medium at the contact with the conical disc surfaces and having coacting edge portions maintaining them in longitudinal alignment with each other, the link members of said chain having pin joint apertures substantially larger than the diameter of the pins and being in rocking bearing contact therewith, the conical discs on the driving shaft each having control levers adapted to move them axially apart or towards each other to vary the chain engagement pitch diameter and drive speed ratio and the conical discs on the driven shaft each having spring members maintaining them in axial compression against the chain in response to adjustment of the driving discs by the control levers.

2. The variable speed drive of claim 1 in which the driving discs are held in adjustable traction contact with the chain and the driven discs are held in initially limited contact therewith.

3. The variable speed drive of claim 2 in which said initially limited traction contact is effected by an axially extending annular sleeve interposed between the driven discs.

4. The variable speed drive of claim 1 in which means coacting with the driving discs to limit traction contact with the driven discs comprise graduated traction engagement with the driven discs.

5. The variable speed drive of claim 1 in which the traction members comprise a substantially circular, inclined working face portion, side edge portions for coacting alignment with adjacent traction members, and a hub portion for attachment of the member to a chain pin.

6. The variable speed drive of claim 5 wherein each working face portion further comprises an internally surface concentric with an externally conical disc surface.

7. The variable speed drive of claim 1 further comprising means aligning oppositely spaced traction members with each other and chain pin end portions registering with said means.

* * * * *